(12) United States Patent
Dejeu et al.

(10) Patent No.: US 9,593,582 B2
(45) Date of Patent: Mar. 14, 2017

(54) PROPULSION DEVICE HAVING UNDUCTED COUNTER-ROTATING AND COAXIAL ROTORS

(75) Inventors: Clement Marcel Maurice Dejeu, Fontenailles (FR); Sebastien Pascal, Epouville (FR); Jerome Talbotec, Combs la Ville (FR); Michael Leborgne, Baudour (BE); Ingrid Irene Catherine Lepot, Tinlot (BE)

(73) Assignees: SNECMA, Paris (FR); CENAERO, Gosselies (BE)

( * ) Notice: Subject to any disclaimer, the term of this patent is extended or adjusted under 35 U.S.C. 154(b) by 716 days.

(21) Appl. No.: 14/111,940

(22) PCT Filed: Apr. 13, 2012

(86) PCT No.: PCT/FR2012/050825
§ 371 (c)(1),
(2), (4) Date: Jan. 2, 2014

(87) PCT Pub. No.: WO2012/140385
PCT Pub. Date: Oct. 18, 2012

(65) Prior Publication Data
US 2014/0133982 A1    May 15, 2014

(30) Foreign Application Priority Data

Apr. 15, 2011 (FR) .................................. 11 53315

(51) Int. Cl.
*B64C 11/18* (2006.01)
*F01D 5/14* (2006.01)
(Continued)

(52) U.S. Cl.
CPC ................ *F01D 5/14* (2013.01); *B64C 11/18* (2013.01); *B64C 11/48* (2013.01); *F02C 3/067* (2013.01);
(Continued)

(58) Field of Classification Search
CPC ......... B64C 11/18; B64C 11/48; F01D 5/141; F02C 3/067
See application file for complete search history.

(56) References Cited

U.S. PATENT DOCUMENTS 4,370,097 A * 1/1983 Hanson .................... B64C 11/16
415/119
4,784,575 A * 11/1988 Nelson .................... B64C 11/18
416/144

(Continued)

FOREIGN PATENT DOCUMENTS

| EP | 2 287 072 | 2/2011 |
| FR | 2 935 349 | 3/2010 |
| FR | 2 938 502 | 5/2010 |

OTHER PUBLICATIONS

International Search Report Issued Jul. 26, 2012 in PCT/FR12/050825 Filed Apr. 13, 2012.

*Primary Examiner* — Ninh H Nguyen
(74) *Attorney, Agent, or Firm* — Oblon, McClelland, Maier & Neustadt, L.L.P.

(57) ABSTRACT

A propulsion device including an unducted upstream propeller and a counter-rotating and coaxial downstream propeller. At least one blade of the upstream propeller is configured to generate a corotating secondary vortex for acting upstream of the downstream propeller to destabilize a blade tip vortex of the same at least one blade.

5 Claims, 4 Drawing Sheets

(51) Int. Cl.
  *B64C 11/48* (2006.01)
  *F02C 3/067* (2006.01)
  *F02C 3/10* (2006.01)
  *B64D 27/00* (2006.01)

(52) U.S. Cl.
  CPC .......... *F02C 3/10* (2013.01); *B64D 2027/005* (2013.01); *F05D 2220/324* (2013.01); *F05D 2220/325* (2013.01); *F05D 2250/38* (2013.01); *Y02T 50/66* (2013.01)

(56) References Cited

U.S. PATENT DOCUMENTS

| | | | |
|---|---|---|---|
| 5,190,441 A | | 3/1993 | Murphy et al. |
| 5,642,985 A | * | 7/1997 | Spear ............... F01D 5/141 |
| | | | 415/181 |
| 6,328,533 B1 | * | 12/2001 | Decker ............ F01D 5/141 |
| | | | 416/223 A |
| 2010/0054913 A1 | | 3/2010 | Morel |
| 2010/0124500 A1 | | 5/2010 | Lebrun |
| 2011/0044796 A1 | | 2/2011 | Hussain et al. |

\* cited by examiner

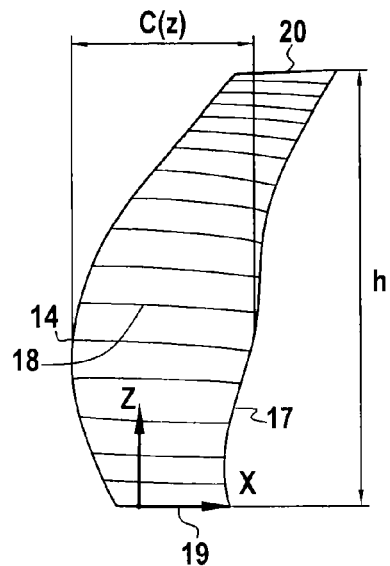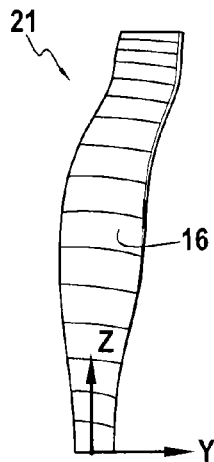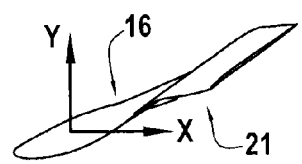
FIG.4A     FIG.4B     FIG.4C
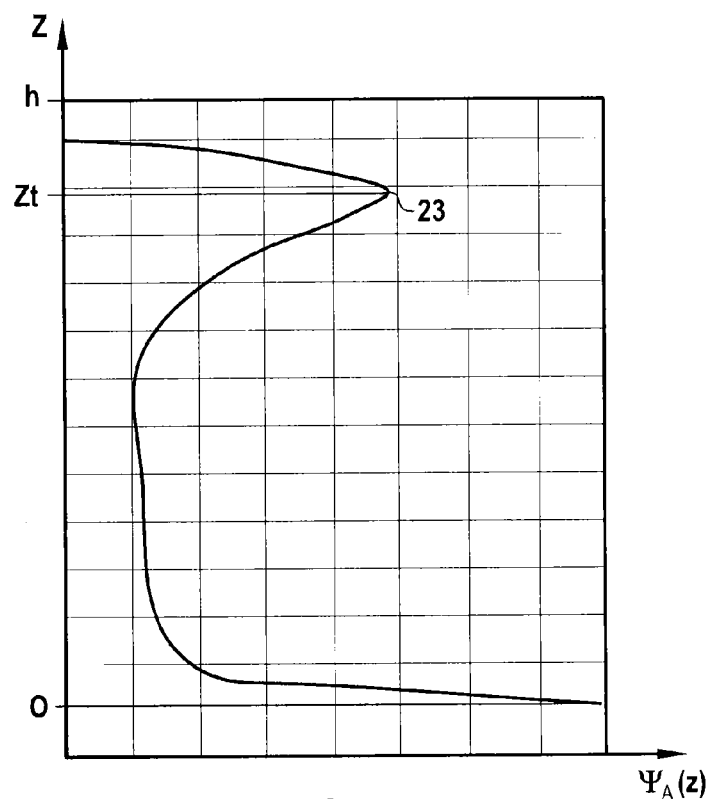
FIG.5

PROPULSION DEVICE HAVING UNDUCTED COUNTER-ROTATING AND COAXIAL ROTORS

BACKGROUND OF THE INVENTION

The present invention relates to a propeller blade and to a propulsion device including an unducted upstream propeller and a counter-rotating and coaxial downstream propeller, and also to a method of eliminating interaction noise between the counter-rotating first and second propellers.

In the context of the present description, the terms "upstream" and "downstream" relate to the upstream and downstream directions respectively in the flow of a propulsive fluid through the two propellers. Typically, each propeller blade has a plurality of blade sections stacked along a radial axis over a height h between a blade root and a blade tip, each blade section extending between a leading edge and a trailing edge and between a pressure side and a suction side.

Pairs of unducted counter-rotating and coaxial propellers (also known as "open rotors" or as "unducted fans" (UDFs)), and in particular pairs operating at high speed, present very great potential for reducing fuel consumption, and thus for reducing the environmental impact and utilization costs in aircraft propulsion in comparison with present-day bypass turbojets. Nevertheless, such propulsion devices having unducted counter-rotating and coaxial high-speed propellers on the same axis present the drawback of relatively high levels of sound emission.

One of the main factors contributing to these sound emissions lies in the interaction between the counter-rotating propellers, and in particular in blade tip vortices of the first propeller being carried away in the flow direction of the propulsive fluid and impacting against the blades of the second propeller located downstream. As well as the noise nuisance, the pressure gradient generated by such impacts on the surface of the second propeller can reduce its propulsive efficiency and can also constitute an additional source of mechanical fatigue for the blades of the second propeller.

A first solution that has been proposed for this problem lies in reducing the diameter of the downstream propeller so that the blade tip vortices of the upstream propeller pass outside the blade tips of the downstream propeller and do not interact therewith. Such clipping of the blade tips of the downstream propeller is not satisfactory since it reduces propulsion performance.

Another solution, proposed in U.S. Pat. No. 5,190,441, consists in significantly increasing the dihedral angle of the blade tips of the upstream propeller so as to weaken the blade tip vortices in a manner analogous to the vortex weakening provided by the winglets installed at the ends of the wings of certain aircraft in order to reduce the effects of wing tip vortices. Nevertheless, apart from presenting relatively limited effectiveness in reducing blade tip vortices, that solution also presents structural drawbacks.

In yet another solution, proposed in French patent application FR 2 935 349, a stream of air is ejected at the blade tips of the upstream propeller in order to weaken the blade tip vortices by interacting with the boundary layer. In similar manner, proposals are made in European patent application EP 2 287 072 A2 to eject such an air stream at the blade tips in order to generate a secondary vortex for the purpose of destabilizing the blade tip vortex. Friction between two parallel corotating vortices is capable of destabilizing and indeed of destroying both vortices, even when the intensities of the two vortices are very different.

OBJECT AND SUMMARY OF THE INVENTION

Nevertheless, the invention seeks to propose a propeller blade that generates a secondary vortex in operation for destabilizing the blade tip vortex in order to reduce interaction between this blade tip vortex and a downstream propeller, but without significantly complicating the structure or the fabrication of upstream and downstream propeller blades, and without significantly affecting their propulsion efficiency.

In at least one embodiment, this object is achieved by the fact that the blade presents positive sweep at the blade tip and, between the positive sweep and the negative sweep, a rounded portion at a radial position $z_v$ at a distance of less than 0.7×h from the blade root, and each blade section presents a chord of function C(z) for which the derivative dC/dz presents a first local maximum between the blade root and the position $z_v$, a local minimum between the position $z_v$ and a radial position $z_t$ at a distance lying in the range 0.7×h to 0.8×h from the blade root, and a second local maximum between the position $z_t$ and the blade tip. The position $z_v$ of the rounded portion may in particular be a distance lying in the range 0.2×h to 0.4×h from the blade root.

With this special shape, the blade is capable in operation of generating a secondary vortex at a radial distance lying in the range 0.60×h to 0.95×h from the blade root. This position for the center of the secondary vortex is found to be particularly advantageous for destabilizing the blade tip vortex in rapid and effective manner.

Because of its shape, this blade may present at a radial position $z_t$ lying in the range 0.7×h to 0.8×h from the blade root a local maximum that has a Zweifel load coefficient $\Psi_A$ per blade section that is greater than 0.8 and that has a positive sweep for the leading edge. The term "Zweifel coefficient $\Psi_A$" designates a non-dimensional coefficient representative of the local load on each blade section in application of the following equation:

$$\Psi_A = \frac{\rho v_x s \Delta v_y}{(p_{tot,BA} - p_{stat,BF})C}$$

where ρ is the density of the propulsive fluid, $v_x$ is the speed of the propulsive fluid relative to the blade in a direction parallel to the axis of rotation of the blade, $\Delta v_y$ is the change in speed of the propulsive fluid relative to the blade tangentially to the rotation of the propeller between the leading edge and the trailing edge of the blade, s is the pitch of the propeller, i.e. the distance between the blades at this radial position, $P_{tot,BA}$ is the total pressure at the leading edge, $P_{stat,BF}$ is the static pressure at the trailing edge, and C is the chord of the blade section.

Because of the local maximum of the local load, given by a local maximum in the Zweifel coefficient $\Psi_A$, the blade will be subjected to local separation at the leading edge at this location, which local separation, because of the positive sweep of the leading edge, serves to generate a vortex on the suction side at a distance from the blade tip that is suitable for preventing it from becoming wound around the blade tip vortex downstream from the trailing edge, thereby destabilizing the blade tip vortex so as to minimize its interaction with the downstream propeller.

Advantageously, in order to give rise to the local maximum in the local load at the position $z_t$, if the blade sections are offset from the radial axis Z in a tangential direction Y in application of a function $y_g(z)$, then the shape of the blade may for example be such that the derivative $dy_g/dz$ of the function $y_g(z)$ presents a local maximum and a local minimum between the position $z_t$ and the blade tip. The aerodynamic load at the position $z_t$ is thus accentuated, giving rise to a local maximum in the Zweifel coefficient $\Psi_A$, and thus giving rise to the separation and the secondary vortex.

The invention also provides a method of suppressing interaction noise between an unducted upstream propeller and a counter-rotating and coaxial downstream propeller.

In at least one implementation of this method, a blade tip vortex from at least one upstream propeller blade is destabilized upstream from the downstream propeller by a corotating secondary vortex generated by the same blade and forming at a radial distance lying in the range 0.6×h to 0.95×h from the blade root. For this purpose, the leading edge of the blade presents a positive sweep at the blade tip, and between the positive sweep and a negative sweep, it presents a rounded portion at a radial position $z_v$ at a distance of less than 0.7×h from the blade root, and each blade section of said blade presents, between the leading edge and the trailing edge, a chord of function C(z), for which the derivative dC/dz presents a first local maximum between the blade root and the position $z_v$, a local minimum between the positions $z_v$ and $z_t$, and a second local maximum between the position $z_t$ and the blade tip. The position $z_v$ of the rounded portion may in particular be a distance lying in the range 0.2×h to 0.4×h from the blade root.

BRIEF DESCRIPTION OF THE DRAWINGS

The invention can be well understood and its advantages appear better on reading the following detailed description of an embodiment given by way of a non-limiting example. The description refers to the accompanying drawings, in which:

FIGS. 4A, 4B, and 4C are three views of a propeller blade in a first embodiment;

FIG. 5 is a graph plotting the coefficient ΨA as a function of radial position.

DETAILED DESCRIPTION OF THE INVENTION

Figure 1A:
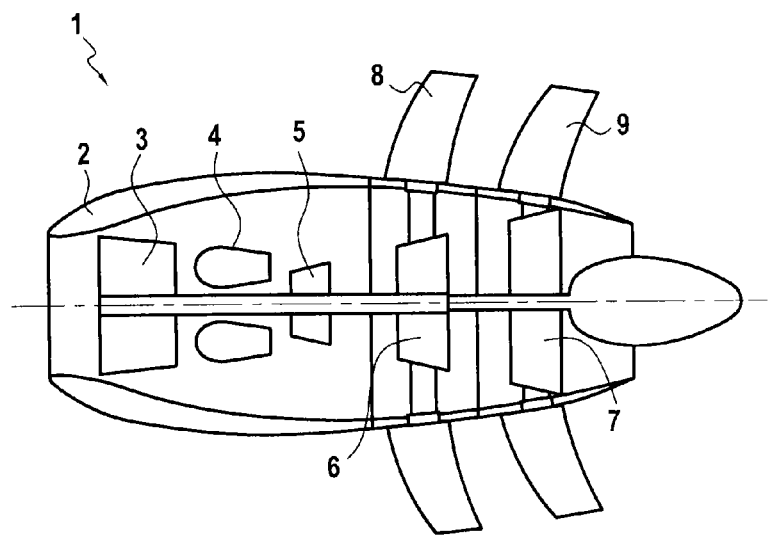
FIGS. 1A and 1B are diagrams of two examples of propulsion devices having pairs of rapid-rotation unducted counter-rotating and coaxial propellers.
Figure 1B:
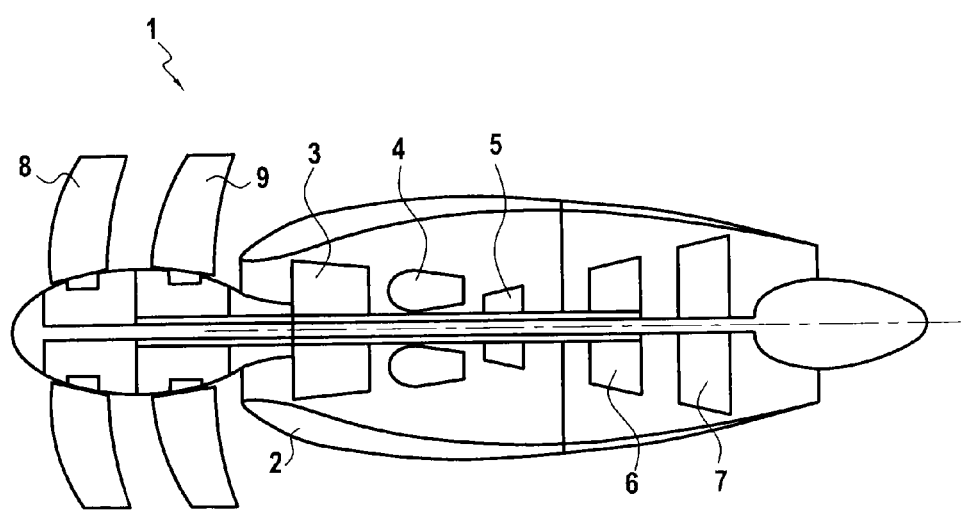

FIGS. 1A and 1B show respective propulsive devices 1 of the type comprising a turbine engine with unducted counter-rotating and coaxial propellers. Inside a nacelle 2, the device 1 comprises a compressor 3, a combustion chamber 4, a high pressure turbine 5 coupled to drive the compressor 3 in order to actuate it, and two counter-rotating low pressure turbines 6 and 7. Outside the nacelle 2, the device 1 also has two counter-rotating and coaxial propellers 8 and 9 that are drivingly coupled to respective ones of the two low pressure turbines 6 and 7.

In a so-called "pusher" configuration, the propellers 8, 9 may be situated downstream from the nacelle 2, as shown in FIG. 1A. Alternatively, in a so-called "tractor" configuration, the propellers 8, 9 are situated upstream from the nacelle 2. Nevertheless, in both configurations, the downstream propeller 9 is exposed to vortices generated by the upstream propeller 8. In particular, the blade tip vortices from the upstream propeller 8 have the potential of generating sound emissions and vibrations on a large scale as a result of impacting against the blades of the downstream propeller 9. It is thus important to eliminate these blade tip vortices, or at least to destabilize them further upstream from the downstream propeller 9.

Figure 2:
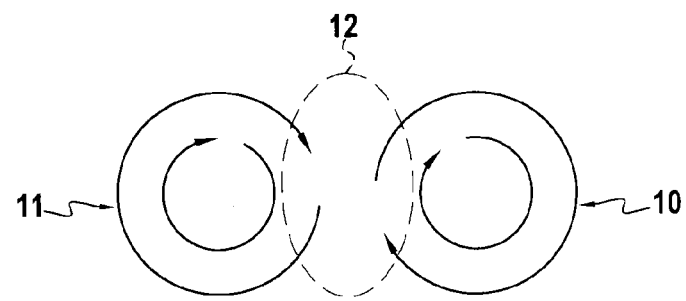
FIG. 2 is a diagram of two counter-rotating vortices.

One method of destabilizing a vortex 10 is that of generating another vortex 11 that is corotating substantially parallel with and in the proximity of the first vortex 10. As shown in FIG. 2, this situation creates a zone 12 of friction between the two vortices 10 and 11, thereby contributing to rapidly dissipating the energy of both of them.

Figure 3:
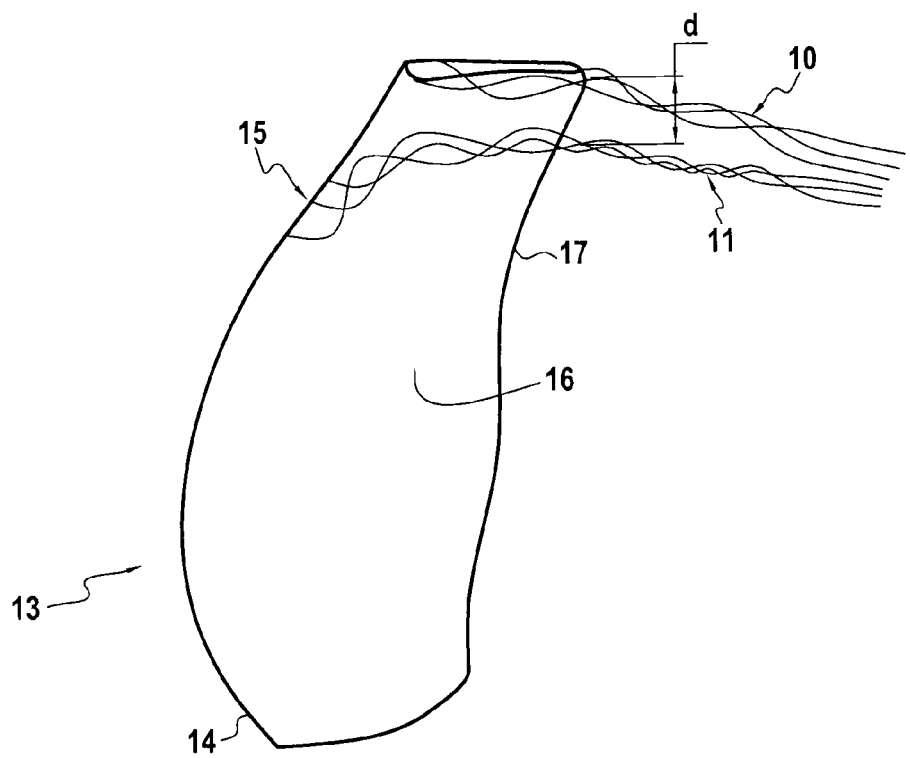
FIG. 3 is a diagrammatic perspective view of a propeller blade generating a blade tip vortex and a secondary vortex destabilizing the blade tip vortex.

FIG. 3 shows an embodiment of a propeller blade 13 that generates such a secondary vortex 11 in order to destabilize the blade tip vortex 10. In this embodiment, the vortex 11 starts from a local flow separation at the leading edge 14 of the blade 13. Because of the positive sweep of the leading edge 14 along the separation zone 15, a secondary vortex 11 is created on the suction side 16, and it reaches the trailing edge 17 at a radial distance d from the blade tip vortex 10 with an orientation that is substantially parallel thereto. Since the two vortices 10 and 11 are corotating, their mutual friction dissipates their energy and destabilizes them quickly.

The shape of the blade 13 is shown more clearly in FIGS. 4A, 4B, and 4C, which show the blade 13 respectively from the side, from in front, and from above. The axes X, Y, and Z are respectively a longitudinal axis parallel to the axis of rotation of the propeller, an axis tangential to the rotation of the propeller, and a radial axis of the blade 13. The blade 13 has a plurality of blade sections 18 stacked along the radial axis Z over a height h from the root 19 to the tip 20, each section 18 extending between the leading edge 14 and the trailing edge 17, and between the pressure side 21 and the suction side 16. The leading edge 14 presents negative sweep at the root 19, positive sweep at the tip 20, and between the negative sweep and the positive sweep, a convex portion 22.

In order to ensure that the blade tip vortex 10 is destabilized more effectively by the secondary vortex 11, and in order to prevent the two vortices from joining or winding one around the other, the distance of the center of the secondary vortex 11, at its origin, from the root of the blade 19, should lie in a range of 0.60 times to 0.95 times the height h. In order to ensure flow separation at the proper location for positioning the vortex 11 in this way and consequently for destabilizing the blade tip vortex 10, the shape of the blade 13 is such that the coefficient $\Psi_A$ as a function of position z along the radial axis Z, plotted as a curve in FIG. 5, presents a large peak 23 at a radial position $z_t$ at a distance from the blade root 19 lying in the range 0.7 times to 0.8 times the height h. This peak reaches a local maximum $\Psi_{A,max}$ that is clearly greater than 0.80, e.g. that lies in a range 0.80 to 1.30.

Figure 6A:
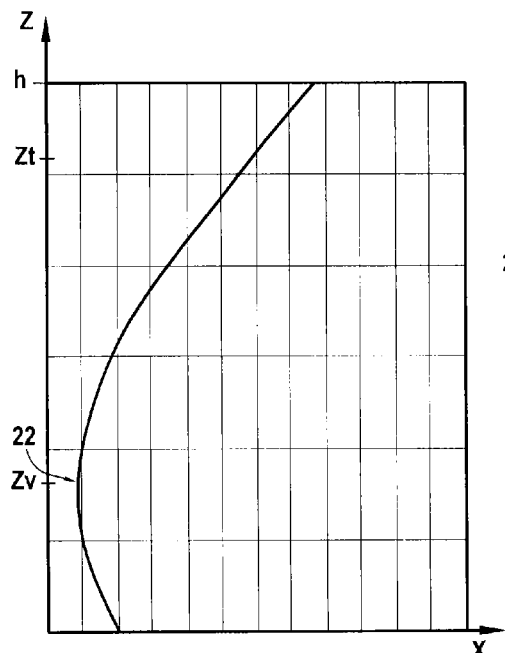
FIGS. 6A, 6B, and 6C are graphs respectively plotting the position of the leading edge, the derivative dY/dz of the chord, and the derivative dY/dz of the tangential offset of a blade section as a function of radial position.
Figure 6B:
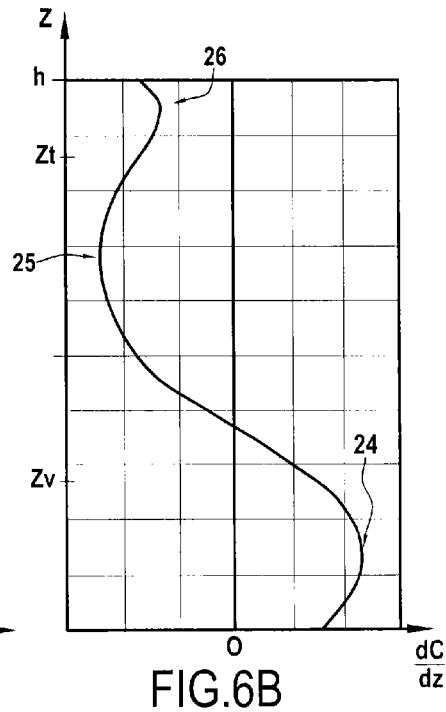
Figure 6C:
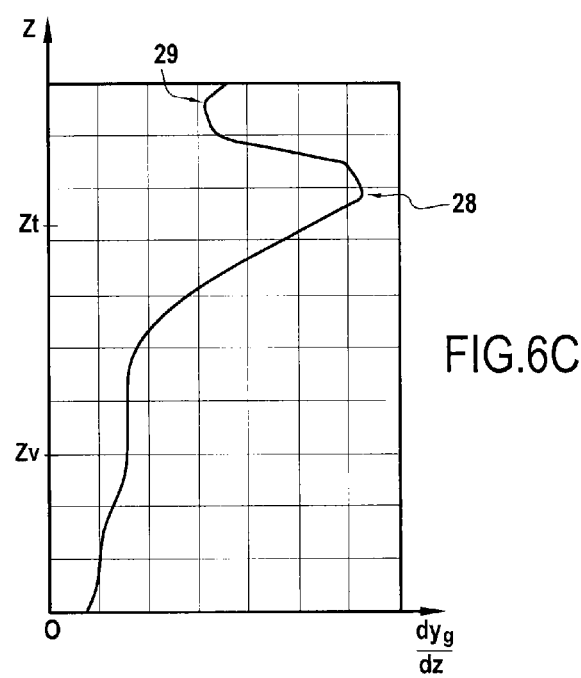

In the embodiment shown, this local maximum of the Zweifel coefficient $\Psi_A$ depends on the specific shape of the blade 13, and in particular on the geometrical parameters shown in FIGS. 6A to 6C. FIG. 6A shows the shape of the leading edge 14 of the blade 13. It can be seen that the rounded portion 22 is situated at a radial position $z_v$ at a distance from the blade root 19 lying in the range 0.2 times to 0.4 times the height h. FIG. 6B shows the derivative dC/dz of the function C(z) defining the chord of each blade section 18 as a function of its radial position z along the axis Z from the blade root 19. It can be seen that this derivative dC/dz presents a first local maximum 24 between the blade root 19 and the position $z_v$ of the convex portion 22, a local minimum 25 between the position $z_v$ and the position $z_t$ of the peak 23 of the Zweifel coefficient and a second local maximum 26 between the position $z_t$ and the tip 20 of the blade.

These local maxima and minimum 24, 26, 25 in the derivative dC/dz correspond to points of inflexion in the function C(z). Outside the position $z_t$, they are also accompanied by at least one point of inflexion in the function $y_g(z)$ determining the offset from the radial axis Z of each blade section 18 along the tangential axis Y going towards the suction side 16, with the center of mass of each section 18 being taken as its reference point. In the derivative $dy_g/dz$ as shown in FIG. 6C, this point of inflexion appears as a local maximum 28 outside the position $z_t$. The points of inflexion of the chord C, and the tangential offset Y of the sections 18 on either side of the position $z_t$ contribute to creating a particularly high aerodynamic circulation at this position $z_t$ as revealed by the peak 23 of the Zweifel coefficient $\Psi_A$ and by the local separation in the zone 15. Another point of inflexion that appears in the derivative $dy_g/dz$ as a local minimum 29 between the local maximum 28 and the blade tip 20 contributes to guiding the secondary vortex 11 over the suction side 16.

Thus, apart from a flow of propulsive fluid in a downstream direction and a reaction force in an upstream direction, the rotation of the upstream propeller generates blade tip vortices that are nevertheless destabilized while still upstream from the downstream propeller by parallel corotating vortices serving to dissipate the energy of the blade vortices in such a manner as to significantly reduce the sound nuisance and the additional aerodynamic loading induced by the impact of the blade tip vortices of the upstream propeller on the blades of the downstream propeller.

Although the present invention is described with reference to a specific embodiment, it is clear that various modifications and changes can be made on this embodiment without going beyond the general ambit of the invention as defined by the claims. Consequently, the description and the drawings should be considered in an illustrative sense rather than in a restrictive sense.

The invention claimed is:

1. A propeller blade comprising:
   a plurality of blade sections stacked in a radial direction over a height h between a blade root and a blade tip, each blade section extending between a leading edge and a trailing edge, and between a pressure side and a suction side;
   wherein the leading edge presents negative sweep at the blade root, positive sweep at the blade tip, and between the negative sweep and the positive sweep, a convex portion at a radial position $z_v$ at a distance lying in a range of 0.2×h to 0.4×h from the blade root,
   each blade section presenting a chord of function C(z) for which a derivative dC/dz presents a first local maximum between the blade root and the position $z_v$, a local minimum between the position $z_v$ and a radial position $z_t$ lying at a distance in a range of 0.7×h to 0.8×h from the blade root, and a second local maximum between the position $z_t$ and the blade tip.

2. A blade root according to claim 1, wherein each blade section presents an offset along a tangential direction towards the suction side in application of a function $y_g(z)$ for which a derivative $dy_g/dz$ presents a local maximum and a local minimum between the position $z_t$ and the blade tip.

3. A propulsive device comprising:
   an unducted upstream propeller and a counter-rotating and coaxial downstream propeller, wherein the upstream propeller includes at least one propeller blade according to claim 1 so that a secondary vortex corotating with a blade tip vortex of the of at least one propeller blade destabilizes the blade tip vortex upstream from the downstream propeller.

4. A method of eliminating interaction noise between an unducted upstream propeller and a counter-rotating and coaxial downstream propeller, wherein at least one blade of the upstream propeller includes a plurality of blade sections stacked along a radial axis over a height h between a blade root and a blade tip, each blade section extending between a leading edge and a trailing edge, and between a pressure side and a suction side,
   the leading edge of the blade presenting a negative sweep at the blade root, a positive sweep at the blade tip, and between the negative sweep and the positive sweep, a convex portion presenting a radial position $z_v$ at a distance lying in a range of 0.2×h to 0.4×h from the blade root;
   each blade section presenting, between the leading edge and the trailing edge, a chord of function C(z) for which a derivative dC/dz presents a first local maximum between the blade root and the position $z_v$, a local minimum between the position $z_v$ and a radial position $z_t$ lying at a distance in a range of 0.7×h to 0.8×h from the blade root, and a second local maximum between the position $z_t$ and the blade tip, the method comprising:
   destabilizing a blade tip vortex of at least one propeller blade of the upstream propeller upstream from the downstream propeller by a corotating secondary vortex generated by the at least one propeller blade.

5. A method according to claim 4, wherein each blade section presents an offset along a tangential axis towards the suction side in application of a function $y_g(z)$ having a derivative $dy_g/dz$ that presents a local maximum and a local minimum between the position $z_t$ and the blade tip.

* * * * *